(12) United States Patent
Farias, III et al.

(10) Patent No.: US 8,091,378 B1
(45) Date of Patent: Jan. 10, 2012

(54) HITCH MOUNTED KEG BEVERAGE DISPENSER

(76) Inventors: Ovidio Farias, III, Manchaca, TX (US);
Jim Lee McNeil, Manchaca, TX (US);
Theresa Eilers, Manchaca, TX (US)

( * ) Notice: Subject to any disclaimer, the term of this patent is extended or adjusted under 35 U.S.C. 154(b) by 441 days.

(21) Appl. No.: 12/228,949

(22) Filed: Aug. 17, 2008

Related U.S. Application Data

(60) Provisional application No. 60/965,204, filed on Aug. 16, 2007.

(51) Int. Cl.
*F25D 3/00* (2006.01)
*B60H 1/32* (2006.01)
*B60R 11/00* (2006.01)
*B65D 83/00* (2006.01)
*B60P 3/22* (2006.01)

(52) U.S. Cl. ............ 62/389; 62/239; 224/519; 224/524; 222/399; 222/608

(58) Field of Classification Search ............ 62/389–400, 62/239, 306; 222/608–610, 399, 400.7; 224/519–521
See application file for complete search history.

(56) References Cited

U.S. PATENT DOCUMENTS

| | | | |
|---|---|---|---|
| 2,792,692 A | 5/1957 | Bryan | |
| 2,917,906 A | 12/1959 | Woolley | |
| 4,164,853 A | 8/1979 | McDonough | |
| 4,225,059 A * | 9/1980 | Kappos | 222/146.6 |
| 4,633,678 A * | 1/1987 | Lea et al. | 62/457.1 |
| 5,584,188 A | 12/1996 | Tippmann et al. | |
| 6,010,043 A | 1/2000 | Williamson et al. | |
| 6,481,238 B1 | 11/2002 | Jennings et al. | |
| 6,491,195 B1 * | 12/2002 | McLemore et al. | 224/537 |
| 2005/0023315 A1 * | 2/2005 | Skinner | 224/506 |

\* cited by examiner

*Primary Examiner* — Frantz Jules
*Assistant Examiner* — Cassey D Bauer
(74) *Attorney, Agent, or Firm* — Kenneth A. Roddy

(57) ABSTRACT

A hitch mounted self-contained keg beverage dispenser removably mounts on a conventional receiver hitch of a vehicle for transporting a beverage keg over long distances to a site of use while maintaining the contents in a cooled condition and dispensing the contents at the site while supported on the transporting vehicle. The dispenser has an insulated container that receives the keg and is mounted on a platform received in the hitch and supported vertically proximate the vehicle rear bumper. The container may be secured to the platform in the vertically supported position and pivoted to an angular position to allow access to the vehicle cargo area. A compressed gas cylinder, a dispensing spigot and a drip tray are mounted on the container. The keg inside the container is surrounded by ice and connected with the gas cylinder and spigot by hoses extending through the container side wall.

4 Claims, 6 Drawing Sheets

HITCH MOUNTED KEG BEVERAGE DISPENSER

CROSS REFERENCE TO RELATED APPLICATION

This application claims priority of U.S. Provisional Application Ser. No. 60/965,204, filed Aug. 16, 2007, the pendency of which is extended until Aug. 18, 2008 under 35 U.S.C. 119(e)(3).

BACKGROUND OF THE INVENTION

1. Field of the Invention

This invention relates generally to beverage coolers and dispensers and more particularly to a hitch mounted keg beverage dispenser for mounting on a hitch assembly of a vehicle for transporting, cooling and dispensing the liquid contents of a pressurized keg.

2. Background Art

Beer is commonly sold in pressurized metal kegs and dispensed directly from the keg during picnics, parties and the like. Half, quarter and one-eighth kegs of beer are widely available from distributors and retailers, and a usually pre-chilled. These metal kegs are heavy and are typically transported by the purchaser to the site where they will be used, and after arrival are placed in a large was tub or trash can and surrounded by crushed ice to keep the beer cold. Beer is dispensed from these kegs by first pressurizing the keg with a manual air pump or by introducing pressurized carbon dioxide into the keg from a canister, and then drawing the beer from the keg through a spout, spigot or tap. However, various problems have been associated with this practice.

It is typically preferred that the pre-chilled keg remain in a chilled condition, or at least not reach an elevated temperature, at all times for best flavor. Thus, one of the problems associated with this practice is that if the point of purchase is a long distance from the site where the beer will be dispensed, there is a likelihood that the beer may reach an elevated temperature and lose the desired flavor.

Another problem with the use of kegs is that the transport, handling, and dispensing set-up is troublesome for the user. The full metal kegs are typically quite heavy, and are difficult to carry manually. The keg must be lifted and placed into the transporting vehicle, and then manually unloaded at the site of use and placed into the receptacle.

Insulated containers have heretofore been suggested to retard the melting of the ice and to lengthen the time during which kegs of this type can be kept cool, some of which are supported on wheels or casters. Special electric refrigerators are also commercially available for chilling and serving beer from kegs at a desired temperature. However, the insulated containers and electrical refrigeration units are also very heavy and, if the site of use is a long distance away, that must be lifted and placed into the transporting vehicle, and then manually unloaded. Another disadvantage of electrical units is that they require an accessible electrical outlet at the site of use to supply electricity and are impractical in locations where electricity is not readily accessible.

There are several patents directed toward various apparatus designed to alleviate at least some of these problems. A variety of different insulated containers have been suggested for advantageously cooling kegs with ice, some of which include an insulated housing on wheels or casters for limited portability. Others are directed to relatively large wheeled trailers having elaborate cooling systems.

Bryan, U.S. Pat. No. 2,792,692 discloses a keg cooler and dispensing bar unit having a keg enclosure in the form of an ordinary barrel for holding the keg in an upright position on the barrel floor with a bar top having a faucet fitted over the open top end of the barrel and a carbon dioxide cylinder mounted on the barrel with gas connections to the top. There is no provision for transporting the dispensing bar unit.

Woolley, U.S. Pat. No. 2,917,906 discloses a portable cooler, gasser and dispenser for keg beer and the like. The apparatus includes a compact wheeled open top cylindrical housing that receives and supports a keg, surrounding ice or other refrigerant, and on which is mounted a gas tank and dispensing tap.

McDonough, U.S. Pat. No. 4,164,853 discloses a keg cooler having an insulated container supported on wheels which receives a beer keg. Support ribs within the container provide rigidity to the container bottom and support the beer keg. Each rib has a plurality of apertures that allow the cooling media, preferably ice water, to circulate therethrough and cool the beer within the container.

Kappos, U.S. Pat. No. 4,225,059 discloses a portable insulated ice cooled container and dispenser mounted on a traveling trailer equipped with tongue and trailer hitch and attachable to a towing motor vehicle. The container holds a plurality of receptacles such as beer kegs and the like to be transported to a point of use for on-site dispensing. Dispensing hoses for the contents of the receptacles are trained through ice in an ice chamber and connect to spigots mounted on and exteriorly of the container. The trailer carries apparatus for pressurizing the contents of the receptacles and includes a jackleg for maintaining a level position of the container when detached from the towing vehicle. Separate latchable doors are provided for the ice chamber and the carrying area for the receptacles.

Lea et al, U.S. Pat. No. 4,633,678 discloses a beer keg cooler having a container and a removable lid of relatively thick wall insulated construction larger than a keg to be accommodated by the cooler so that ice may be packed around the keg. A flexible, web shaped harness is secured to the inner wall of the container and straps of the harness are secured by buckles so that the harness can be adjusted to bridge across the container in tight engagement against the keg to secure the keg in position and to prevent the keg from floating as the ice melts. The container has a notch formed in its upper rim to accommodate beverage dispensing equipment and the lid has a central opening for the same purpose. A flexible flap over the lid opening seals any portion of the opening not required for this purpose. There is no provision for transporting the keg cooler.

Tippmann et al, U.S. Pat. No. 5,584,188 discloses a refrigerated beverage trailer having floor, wall and roof members formed of polyurethane with a covering layer of fiberglass reinforced resinous material to form a monolithic enclosure with a closure member. Beverage dispensing spigots are provided on the side of the enclosure and a wheel and hitch assembly is secured to the floor member by the same resinous material. An aperture is provided through one wall for receiving the evaporator of a refrigeration system mounted on the outside wall of the trailer for cooling the interior of the trailer and its contents, and a generator is mounted on the hitch assembly to supply electrical power to the refrigeration system.

Williamson, U.S. Pat. No. 6,010,043 discloses a self-contained portable beverage dispensing system that includes a housing supported on wheels and a support leg. The housing has an interior space for containing a beverage container, a first cooling well for pre-cooling the beverage within the beverage container, and a second cooling well for cooling the beverage after it leaves the beverage container, and a gas-supply tank disposed within the interior space is used to pressurize the beverage container.

Jennings et al, U.S. Pat. No. 6,481,238 discloses a keg server having an insulated housing supported on casters. The housing has a door and two opposed side walls with support racks on the interior of the opposed side walls that are spaced from one another to receive a keg therebetween and chiller panels containing a freezable liquid are removably received on the racks. A spout on the housing and a pressurized gas canister in the housing are connectable to the keg.

The present invention is distinguished over the prior art in general, and these patents in particular by a hitch mounted self-contained keg beverage dispenser that is removably mounted on a conventional receiver hitch of a vehicle and capable of transporting a beverage keg over long distances to a site of use while maintaining the contents in a cooled condition and dispensing the contents at the site while supported on the transporting vehicle. The dispenser has a cylindrical insulated container that receives the keg and is mounted on a cross-shaped tubular platform adapted to be received in the hitch and support the container vertically proximate the vehicle rear bumper. The container may be secured in a vertically supported position on the platform and pivoted to an angular position relative to the platform to allow access to the cargo area of the vehicle. A compressed gas cylinder, a dispensing spigot and a drip tray are mounted on the side wall of the container. The keg inside the container is surrounded by ice and connected with the gas cylinder and the spigot and by hoses extending through the container side wall. The dispenser significantly reduces the time and effort involved in loading, transporting, and manually handling heavy kegs from the point of purchase to the site of use.

SUMMARY OF THE INVENTION

It is therefore an object of the present invention to provide a hitch mounted keg beverage dispenser that is removably mounted easily and quickly on a conventional hitch assembly of a vehicle for transporting, cooling and dispensing the liquid contents of a pressurized keg.

It is another object of this invention to provide a hitch mounted keg beverage dispenser that allows a keg containing a beverage to be easily transported over long distances while maintaining the contents in a cooled condition and prevent loss of the desired flavor.

Another object of this invention is to provide a hitch mounted keg beverage dispenser that will significantly reduce the time and physical effort involved in loading, transporting, and manually handling heavy kegs from the point of purchase to the site of use, and the time involved in setting up the dispensing apparatus.

A further object of this invention is to provide a hitch mounted keg beverage dispenser that is self-contained and allows a keg containing a beverage to be easily transported over long distances and to be easily and quickly dispensed at any location while connected with the transporting vehicle.

A still further object of this invention is to provide a hitch mounted keg beverage dispenser that is simple in construction, inexpensive to manufacture, and rugged and reliable in use.

Other objects of the invention will become apparent from time to time throughout the specification and claims as hereinafter related The above noted objects and other objects of the invention are accomplished by a hitch mounted self-contained keg beverage dispenser that is removably mounted on a conventional receiver hitch of a vehicle and capable of transporting a beverage keg over long distances to a site of use while maintaining the contents in a cooled condition and dispensing the contents at the site while supported on the transporting vehicle. The dispenser has a cylindrical insulated container that receives the keg and is mounted on a cross-shaped tubular platform adapted to be received in the hitch and support the container vertically proximate the vehicle rear bumper. The container may be secured in a vertically supported position on the platform and pivoted to an angular position relative to the platform to allow access to the cargo area of the vehicle. A compressed gas cylinder, a dispensing spigot and a drip tray are mounted on the side wall of the container. The keg inside the container is surrounded by ice and connected with the gas cylinder and the spigot and by hoses extending through the container side wall. The dispenser significantly reduces the time and effort involved in loading, transporting, and manually handling heavy kegs from the point of purchase to the site of use.

DESCRIPTION OF THE PREFERRED EMBODIMENT

Figure 1:
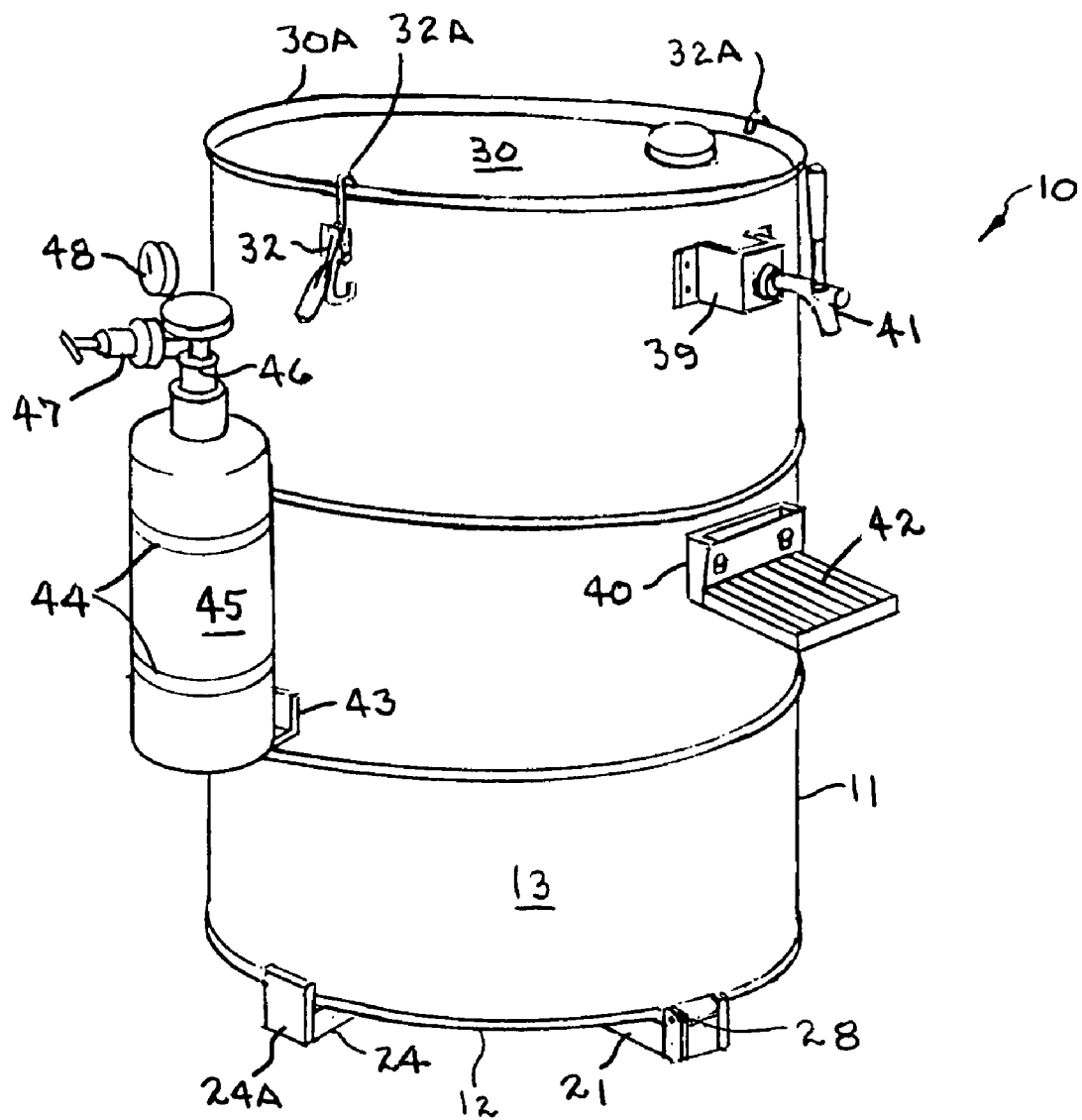
FIG. 1 is a perspective view of the hitch mounted keg beverage dispenser apparatus in accordance with the present invention.
Figure 2:
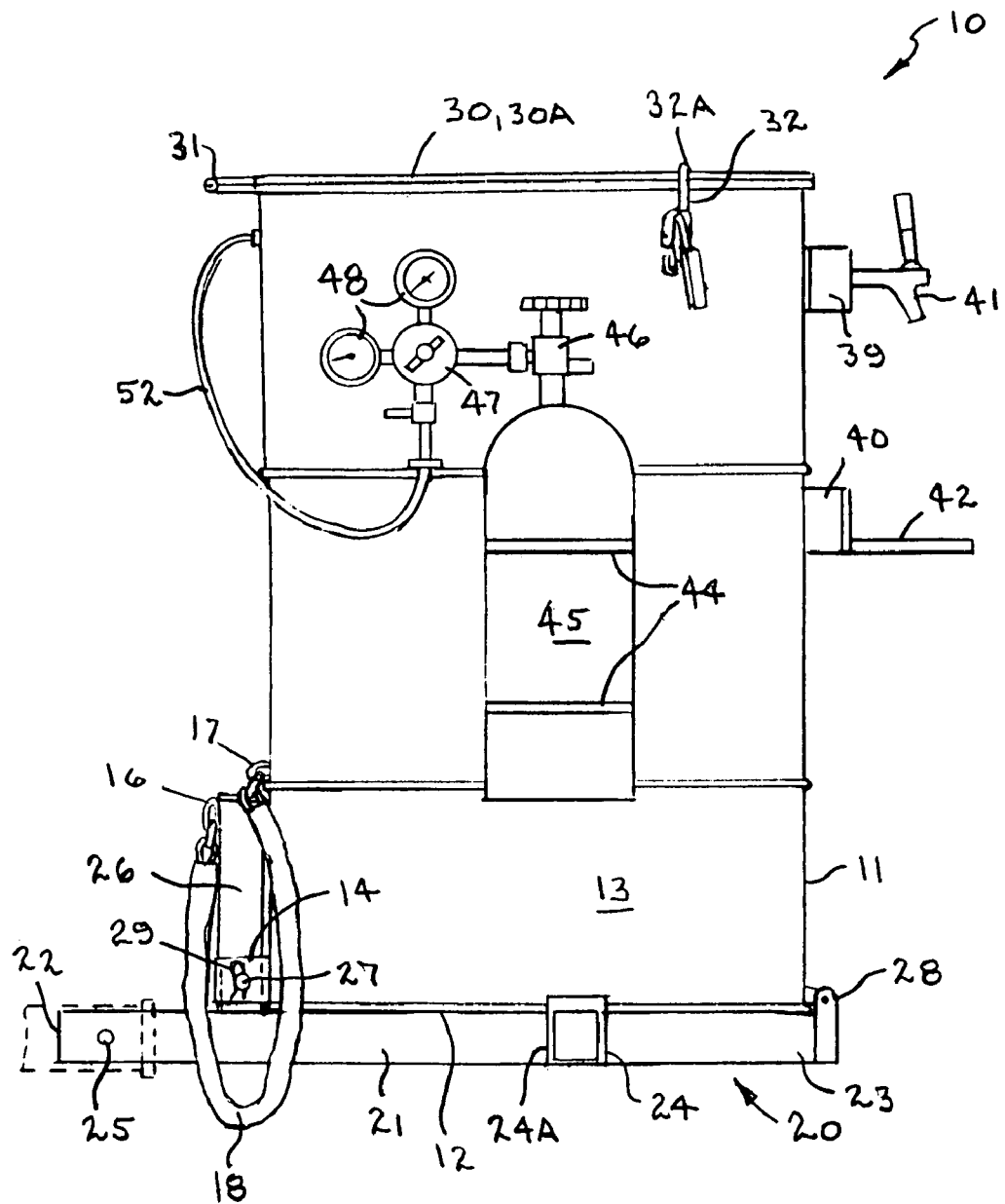
FIG. 2 is a side elevation view of the hitch mounted keg beverage dispenser apparatus, shown with the insulated container in a vertical transport position on the support platform.
Figure 3:
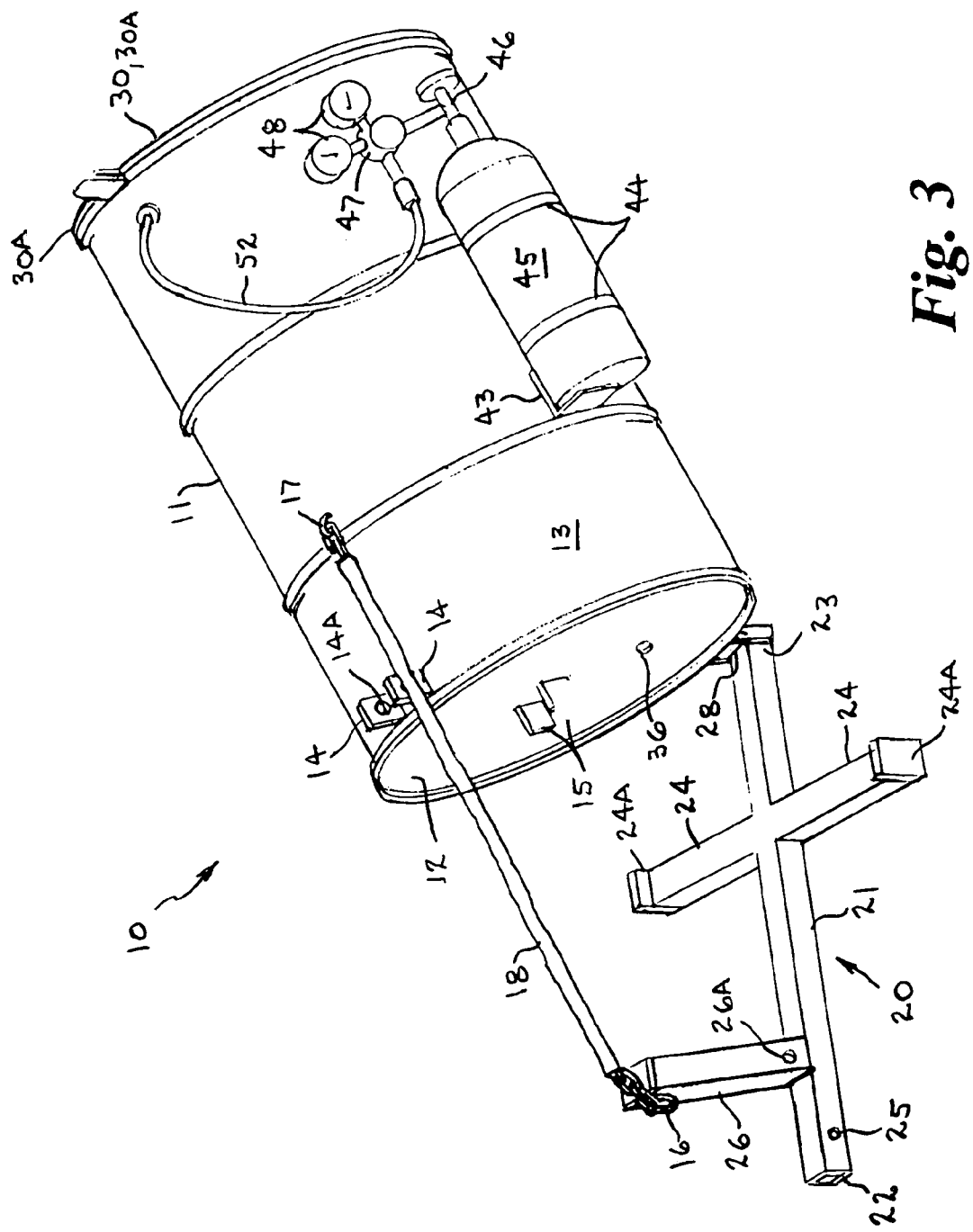
FIG. 3 is a perspective view of the hitch mounted keg beverage dispenser apparatus, shown with the insulated container in a pivoted position relative to the support platform.

Referring to the drawings by numerals of reference, there is shown in FIGS. 1, 2 and 3, a a hitch mounted keg beverage dispenser apparatus 10 for mounting to a conventional receiver-style hitch assembly of a vehicle (not shown) of the type having a tubular sleeve fixedly mounted to the vehicle. The hitch mounted keg beverage dispenser apparatus 10 includes a cylindrical metal container 11, such as a 55-gallon barrel or drum, which is mounted on a support platform 20, for containing a beverage keg. As best seen in FIG. 3, the support platform 20 is a generally cross-shaped configuration formed of rectangular tubing welded together to form a central longitudinal leg 21 having first and second ends 22, 23, respectively, and a pair of lateral legs 24 disposed intermediate its ends extending outwardly from opposed sides thereof in laterally opposed relation.

Figure 4:
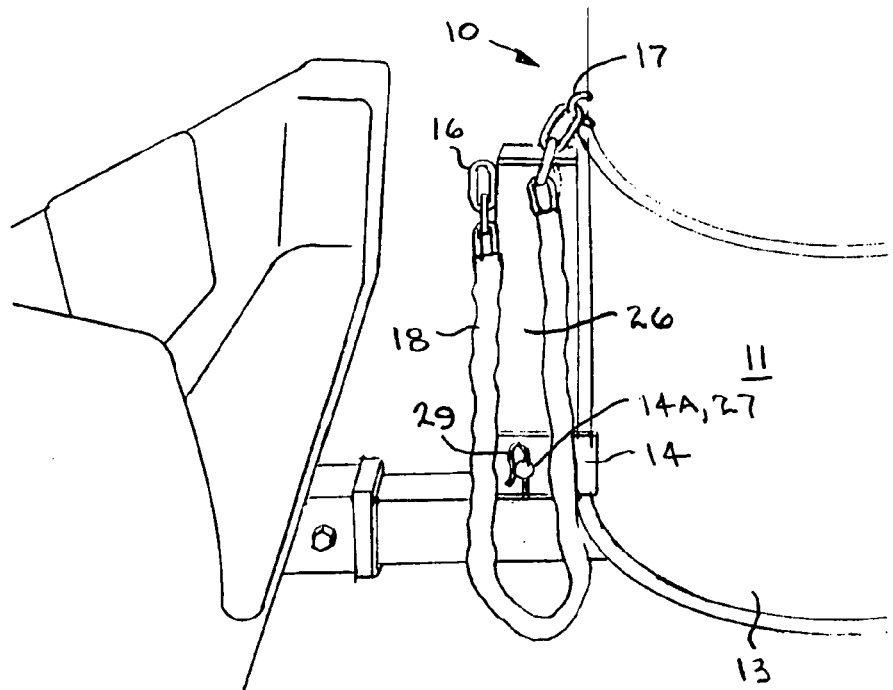
FIG. 4 is a partial side elevation view of the vertical upright member and the retaining chain connected with container that retains the container in an angular position relative to the platform when it is pivoted forwardly away from the platform.
Figure 5:
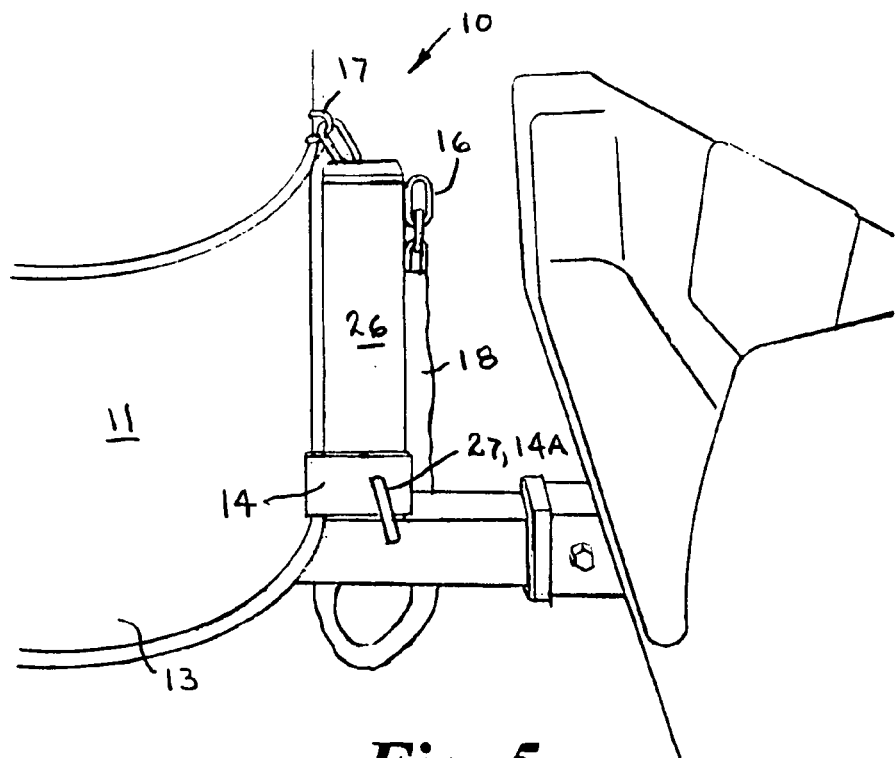
FIG. 5 is a partial side elevation view of the vertical upright member and the latch pin that secures the container in vertical upright position on the platform.

The first end 22 of the platform 20 is adapted to be matingly received within the hitch sleeve of the conventional hitch assembly and is provided with apertures for receiving a conventional locking pin to secure the longitudinal leg 21 of the platform within the hitch sleeve in the conventional manner, such that its second end 23 and lateral legs 24 are positioned rearwardly from the vehicle a sufficient distance to support the container 11 in a vertical position proximate the rear bumper of the vehicle and a distance above the ground for convenient access and dispensing. As best seen in FIGS. 3, 4 and 5, a vertical upright member 26 formed of rectangular tubing is secured at one end to the central longitudinal leg 21 between the first end 22 and lateral legs 24 and is provided with apertures near its bottom end for receiving a locking pin 27 to releasably secure the container in a vertical position, as described hereinafter. The lateral legs 24 are of sufficient length to receive the bottom end of the cylindrical container 11 and their and outer ends are provided with rectangular end plates 24A that extend a short distance vertically above their top surface to accommodate the bottom end of container and prevent lateral movement. The outer ends of the support platform 20 may be provided with reflectors and/or lights. The lights, if provided, can be electronically connected through a conventional lighting harness.

The cylindrical container 11 has a bottom wall 12 and a side wall 13, and is pivotally mounted on the platform 20 by a hinge 28 fixed to the outer end of the central longitudinal leg 21 and the bottom 12 of the container near its outer periphery. A first pair of laterally spaced ears 14 are secured to the side wall 13 of the container 11 in diametrically opposed relation to the hinge connection and are provided with apertures. The ears 14 are spaced apart a distance to straddle the vertical upright member 26 with their apertures in alignment with the apertures of the vertical upright member when the container is pivoted to its vertical position supported on the platform. The locking pin 27 is inserted through the aligned apertures and releasably retained by a spring clip 29. A second pair of laterally spaced ears 15 may be secured to the bottom wall 12 of the container 11 positioned to straddle the sides of the central longitudinal leg 21 of the platform 20 when the container is pivoted to its vertically supported position on the platform to further prevent lateral movement.

A first ring 16 is secured adjacent to the top end of the vertical upright member 26 and a second ring 17 is secured to the side wall 13 of the container 11 a distance above its bottom end and a length of chain 18 is releasably secured at opposed ends to the rings. The chain 18 is of sufficient length to extend between the vertical upright member 26 and the container 11 and retain the container in an angular position relative to the platform when it is pivoted forwardly away from the platform about the hinge connection, as seen in FIG. 3. This allows access to the bed, trunk, or cargo area of the transporting vehicle while the platform 20 is mounted to the hitch of the vehicle, should the need arise.

A lid 30 having a circumferential raised rim 30A is pivotally mounted on the open top end of the container 11 by a hinge 31 fixed between the lid and the container. A pair of lever-type toggle clamps 32 are mounted on the side wall 13 of the container 11 adjacent to its top end in circumferentially spaced relation and each has a retaining hook 32A at one end that clamps over the raised rim of the lid to releasably secure the lid onto the top of the container in a closed position.

Figure 6:
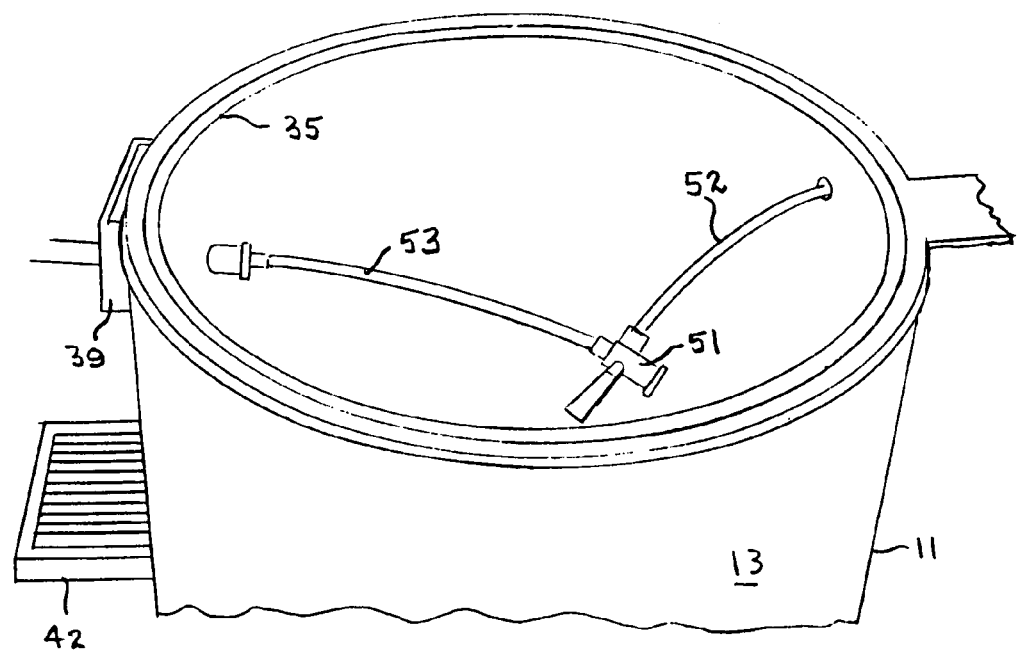
FIGS. 6 and 7 are perspective views from the top of the container, showing the insulated liner, the pressure hose and the dispensing hose.
Figure 7:
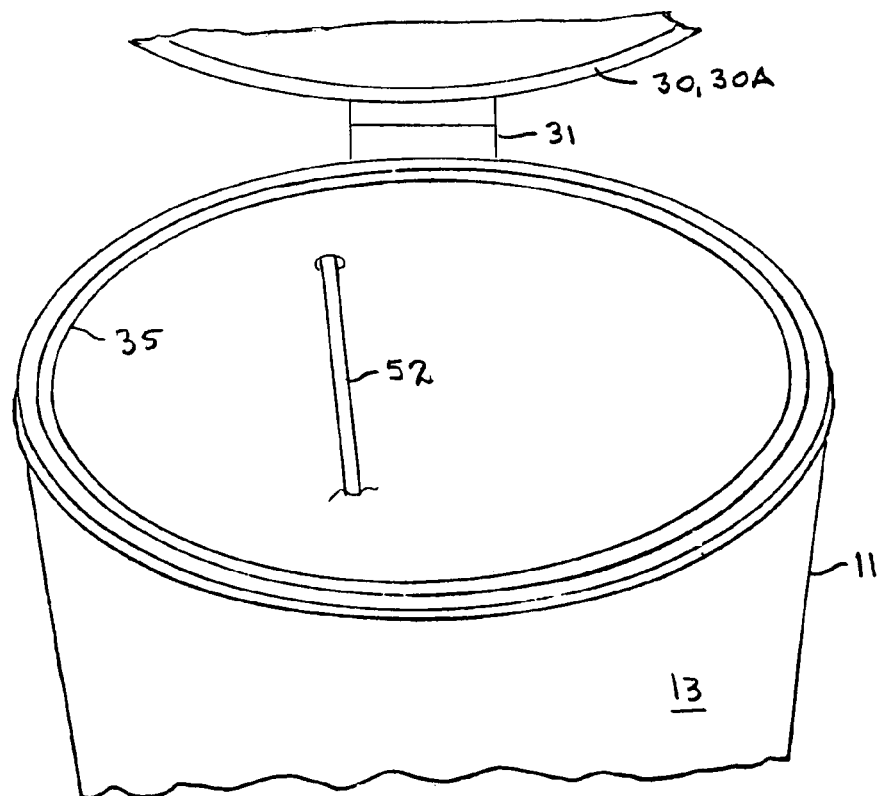
Figure 8:
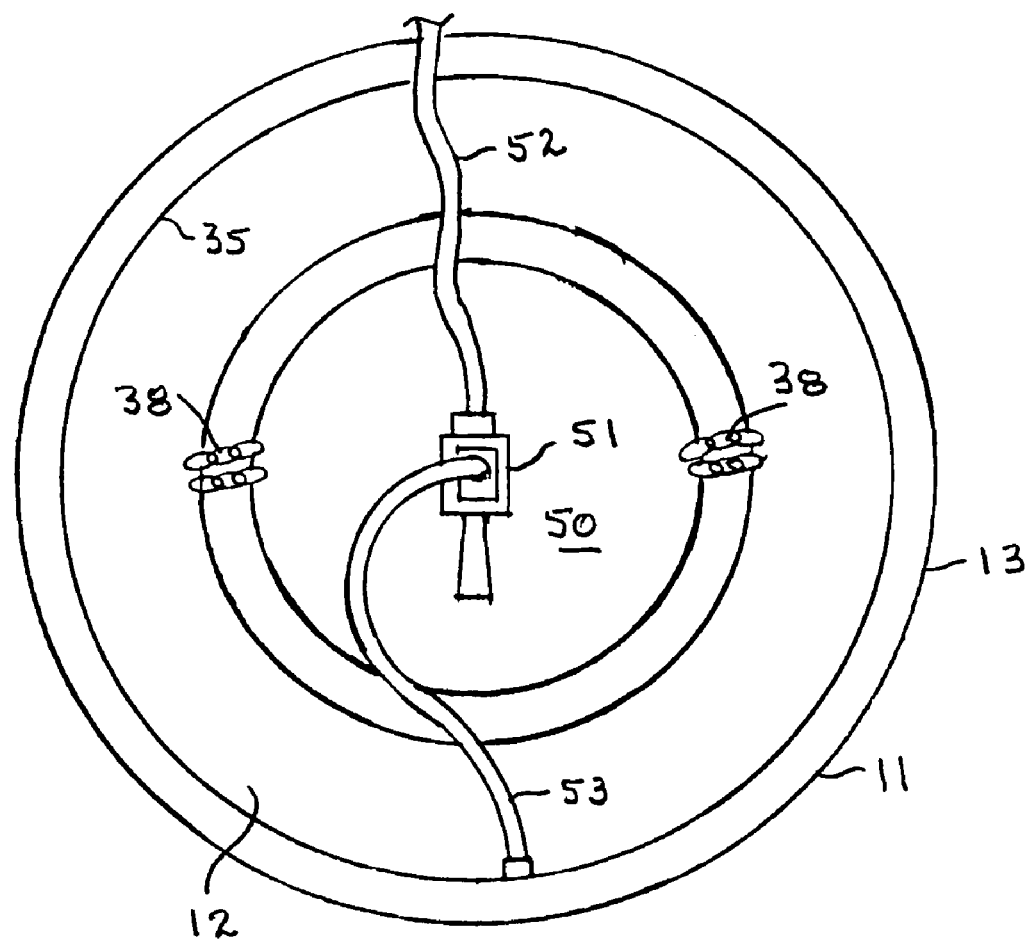
FIG. 8 is a perspective view from the top of the container, showing a keg disposed in the container and connected with the pressure hose and dispensing hoses.

As seen in FIGS. 6, 7 and 8, an insulating sleeve or liner 35 formed of insulating material is secured to the interior of the side wall 13 and bottom wall 12 of the container xx. A drain hole 36 extends through the insulating liner 35 and bottom wall 12 of the container 11 for allowing water to drain from the interior. Mounting lugs or rings are fixed to the inner surface of the bottom wall 12 of the container 11 in diametrically opposed relation and protrude through apertures in the bottom of the insulating liner 35 for connecting hold-down chains 38 that extend from the top of the beverage keg 50 which is placed into the container.

Referring again to FIGS. 1-3, a generally U-shaped upper mounting bracket 39 is secured to the side wall 13 of the container 11 a short distance beneath its top end, and a generally U-shaped lower mounting bracket 40 is secured to the side wall of the container a short distance beneath the upper bracket. A conventional dispensing spigot or tap 41 is mounted on the upper mounting bracket 39 and a drip tray 42 is mounted on the lower mounting bracket 40.

A generally L-shaped support bracket 43 is secured to the side wall 13 of the container 11 and a pair of flexible metal bands 44 each having a clamp connection or other suitable fastener for joining their free ends are secured a short distance above the support bracket. A compressed gas cylinder or tank 45 is supported on the support bracket 43 and secured to the side wall 13 of the container 11 by the metal bands 44. The gas cylinder or tank 45 is provided with a conventional manifold that includes an on-off valve 46, a pressure regulating valve 47, and the standard associated dial indicators 48.

As seen in FIG. 8, a beverage keg 50 is received in the container 11 and supported on the bottom wall 12 of the container and insulating liner 35 and is supported in a vertical position by the hold-down chains 38 that extend from the top of the keg and are connected to the mounting lugs or rings at the bottom of the container. The keg 50 is equipped with a quick coupling fitting 51 at its top end for connection to pressuring and dispensing hoses.

A pressure hose 52 connected at one end to the regulating manifold of the gas cylinder 45 extends through the side wall 13 of the container 11 and liner 35 and its other end is connected with the fitting 51 at the top end of the keg 50. A dispensing hose 53 connected at one end of the spigot or tap 41 extends through the side wall 13 of the container 11 and liner 35 and its other end is connected with the fitting 51 at the top end of the keg 50.

The beverage keg 50 is surrounded by ice for cooling. The hold-down chains 38 retain the keg 50 in a vertical position and prevent it from moving during transport and prevent it from floating as the ice melts and it becomes lighter due to dispensing of its contents.

By the above arrangements, there is thus provided a hitch mounted self-contained keg beverage dispenser that is removably mounted on a conventional hitch assembly of a vehicle and capable of transporting a beverage keg over long distances to a site of use while maintaining the contents in a cooled condition and dispensing the contents at the site while supported on the transporting vehicle, and which significantly reduces the time and effort involved in loading, transporting, and manually handling heavy kegs from the point of purchase to the site of use.

While this invention has been described fully and completely with special emphasis upon a preferred embodiment, it should be understood that within the scope of the appended claims the invention may be practiced otherwise than as specifically described herein.

The invention claimed is:

1. A self-contained hitch mounted keg beverage dispenser for transporting a beverage keg in a cooled condition and dispensing the contents thereof while supported on a receiver hitch of the transporting vehicle, comprising:

a generally cross-shaped support platform formed of tubing having a central longitudinal leg extending from a first end and terminating at a second outer end, and a pair of lateral legs extending outwardly from opposed sides thereof in laterally opposed relation near said second outer end, said first end adapted to be removably mounted on the receiver hitch of the vehicle, said second outer end extending a distance horizontally outwardly from the rear of the vehicle a distance above the ground surface when mounted on the hitch;

a thermally insulated generally cylindrical container pivotally mounted on said platform second outer end in a generally vertical position proximate a rear end of the vehicle, said container having a bottom wall and a side wall defining an interior sized and shaped to removably receive and support a beverage keg therein with an annular space surrounding the keg for receiving ice, and a removable lid for enclosing said interior;

said container hingedly connected at one side to said platform second outer end and selectively movable between a vertical position and an angular position relative to said platform to allow access to a cargo area of the vehicle, and said lateral legs of said platform being of sufficient length to receive said bottom wall of said container in the vertical position and having retaining means at outer ends thereof to prevent lateral movement of said container relative to said lateral leg outer ends in the vertical position;

a compressed gas cylinder including pressure regulating means and a dispensing spigot valve on the exterior of said container; and a pressurizing conduit extending through said container side wall having a first end connected with said gas cylinder pressure regulating means and a second end adapted for releasable connection with the beverage keg for pressuring the contents thereof, and a liquid flow conduit extending through said container side wall having a first end connected with said dispensing spigot valve and a second end adapted for releasable connection with the beverage keg for conducting liquid under pressure from the keg to said dispensing spigot valve.

2. The self-contained hitch mounted keg beverage dispenser according to claim 1, further comprising:
    releasable latch means disposed between said platform and said container for selectively securing said container in the vertical position.

3. The self-contained hitch mounted keg beverage dispenser according to claim 1, further comprising;
    retaining means disposed between said support platform and said container for retaining said container in the angular position relative to said platform.

4. The self-contained hitch mounted keg beverage dispenser according to claim 1, further comprising;
    a drip tray on the exterior of said container disposed a distance beneath said dispensing spigot valve.

* * * * *